United States Patent
Naito et al.

(10) Patent No.: US 7,265,965 B2
(45) Date of Patent: Sep. 4, 2007

(54) CAPACITOR ELEMENT AND CARBON PASTE

(75) Inventors: Kazumi Naito, Chiba (JP); Katutoshi Tamura, Chiba (JP)

(73) Assignee: Showa Denko K.K., Tokyo (JP)

( * ) Notice: Subject to any disclaimer, the term of this patent is extended or adjusted under 35 U.S.C. 154(b) by 0 days.

(21) Appl. No.: 11/174,578

(22) Filed: Jul. 6, 2005

(65) Prior Publication Data

US 2006/0023401 A1    Feb. 2, 2006

Related U.S. Application Data

(60) Provisional application No. 60/587,910, filed on Jul. 15, 2004.

(30) Foreign Application Priority Data

Jul. 7, 2004    (JP)    ............ 2004-201012

(51) Int. Cl.
*H01G 9/04*    (2006.01)
*H01G 9/145*    (2006.01)

(52) U.S. Cl. ..................... 361/532; 361/523

(58) Field of Classification Search ............. 361/502, 361/508–509, 523–525, 529, 532–533; 252/502–503, 252/506
See application file for complete search history.

(56) References Cited

U.S. PATENT DOCUMENTS

| | | | | |
|---|---|---|---|---|
| 6,151,205 A | * | 11/2000 | Kobayashi et al. | ......... 361/523 |
| 6,462,936 B1 | * | 10/2002 | Fujimoto et al. | ........... 361/525 |
| 6,545,858 B1 | * | 4/2003 | Naito et al. | ................. 361/510 |
| 6,661,645 B1 | * | 12/2003 | Sakai et al. | ................. 361/523 |
| 6,663,796 B1 | * | 12/2003 | Ohata et al. | ................ 252/500 |
| 6,696,138 B2 | * | 2/2004 | Sakai et al. | ................. 428/209 |
| 2003/0068550 A1 | * | 4/2003 | Naoi et al. | .................. 429/213 |

FOREIGN PATENT DOCUMENTS

| | | |
|---|---|---|
| JP | 62-66616 | 3/1987 |
| JP | 63-29919 | 2/1988 |
| JP | 63-34917 | 2/1988 |
| JP | 2002-15956 | 1/2002 |

* cited by examiner

*Primary Examiner*—Eric W. Thomas
(74) *Attorney, Agent, or Firm*—Sughrue Mion Pllc.

(57) ABSTRACT

The present invention provides a capacitor wherein increase in the ESR value after a high temperature loading test is mitigated.

A capacitor element, comprising an electric conductor having formed on the surface thereof a dielectric layer as one electrode, and a semiconductor layer, carbon layer and electrode layer formed sequentially on the dielectric layer, which capacitor element is characterized in that the carbon layer contains a dopant; a carbon paste as a material of the capacitor element; a capacitor using the capacitor element; and an electronic circuit and an electronic device using the capacitor.

24 Claims, No Drawings

CAPACITOR ELEMENT AND CARBON PASTE

CROSS REFERENCE TO THE RELATED APPLICATIONS

This is an application filed pursuant to 35 U.S.C. Section 111(a) with claiming the benefit of U.S. Provisional application Ser. No. 60/587,910 filed Jul. 15, 2004 under the provision of 35 U.S.C. Section 111(b), pursuant to 35 U.S.C. Section 119(e) (1).

TECHNICAL FIELD

The present invention relates to a capacitor element having a long operating life and a carbon paste as a material for producing the same.

BACKGROUND ART

An aluminum or tantalum solid electrolytic capacitor is used as a capacitor having high capacitance and low ESR (equivalent series resistance) to be used in various electronics equipment.

The solid electrolytic capacitor is constituted by an aluminum foil having fine pores in the surface layer or a tantalum powder sintered body having fine pores in the inside, which is serving as one electrode (electric conductor), a dielectric layer formed on the surface layer of the electrode, the other electrode (usually a semiconductor layer) provided on the dielectric layer, and a carbon layer and an electrode layer which are sequentially stacked on the other electrode.

For the semiconductor layer, an organic compound or an inorganic compound is used, specifically an electrically conductive polymer is preferably used in view of heat resistance and low ESR property of the capacitor produced thereof. The electrically conductive polymer is a polymer having high electrical conductivity of $10^{-2}$ to $10^3$ $S \cdot cm^{-1}$, and the high electrical conductivity is exhibited by adding a compound so-called dopant to a polymer having a conjugated double bond (generally the polymer is an insulating body or has extremely low electrical conductivity). Examples of a specific method to form an electrically conductive polymer as a semiconductor layer includes a method of supplying an appropriate oxidizing agent or electrons in the presence of a dopant to a monomer capable of being polymerized to an electrically conductive polymer in the fine pores of the electric conductor thereby to polymerize the monomer and to obtain an electrically conductive polymer by incorporating the dopant at the polymerization of the monomer.

The carbon layer is provided for the purpose of protecting the semiconductor layer from various external stress and stably providing or taking electric charge from the semiconductor layer to the dielectric layer. The carbon layer uses a composition of at least one material selected from artificial graphite, natural graphite and carbon black to which a small amount of polymer materials as a binder is added appropriately.

The capacitor having a structure mentioned above is used in various circuits of electronic equipment, and various reliability tests are performed to judge if the initial performance of the capacitor is maintained for several years. One of these tests is a high temperature loading test of the capacitor. The test is to apply a rated voltage to a capacitor and leave it to stand at a high temperature for thousands of hours, and determine the acceptability of the capacitor based on whether the various performance values measured when the capacitor is returned to room temperature fall within a designated range. The capacitor is regarded to have a longer life, if it passes a test at a higher temperature and for a longer time of applying a voltage.

DISCLOSURE OF THE INVENTION

The conventional capacitors have a problem that the ESR value increases in some of the capacitors after a few thousand hours of a loading test at 125° C., for example.

As a result of intensive investigations to solve the problems, the present inventors have found that the increase in the ESR value can be mitigated by making the carbon layer to contain a dopant, and have accomplished the present invention.

That is, the present invention provides the following capacitor element, carbon paste as a material for producing the same, capacitor using the same, and electronic circuit and electronic device using the capacitor.

1. A capacitor element comprising, an electric conductor having formed on the surface thereof a dielectric layer as one electrode; and a semiconductor layer, carbon layer and electrode layer formed sequentially on the dielectric layer; characterized in that the carbon layer contains a dopant.

2. The capacitor element as described in 1 above, wherein the dopant is the same as the dopant contained in the semiconductor layer.

3. The capacitor element as described in 1 or 2 above, wherein the dopant is a compound having a sulfonic acid group.

4. The capacitor element as described in any one of 1 to 3 above, wherein the electric conductor is selected from a metal, an inorganic semiconductor, an organic semiconductor, a mixture of at least one member thereof, and a laminated body having the electric conductor thereof laminated as a surface layer.

5. The capacitor element as described in any one of 1 to 4 above, wherein the electric conductor is a metal or alloy mainly comprising at least one member selected from tantalum, niobium, titanium and aluminum; niobium oxide; or a mixture of at least two of the members selected from these metals, alloy and niobium oxide.

6. The capacitor element as described in any one of 1 to 5 above, wherein the semiconductor layer is at least one member selected from an organic semiconductor layer and an inorganic semiconductor layer.

7. The capacitor element as described in 6 above, wherein the organic semiconductor layer is made of a material which contains a dopant in a polymer selected from polyaniline, polyoxyphenylene, polyphenylene sulfide, polythiophene, polyfuran, polypyrrole, polymethylpyrrole, and substitution derivatives and copolymers thereof.

8. The capacitor element as described in 7 above, wherein the polymer is poly(3,4-ethylenedioxythiophene).

9. The capacitor element as described in 6 above, wherein the inorganic semiconductor is at least one compound selected from molybdenum dioxide, tungsten dioxide, lead dioxide and manganese dioxide.

10. The capacitor element as described in 6 above, wherein the electrical conductivity of the semiconductor is from $10^{-2}$ to $10^3$ S/cm.

11. A capacitor in which the capacitor element described in any one of 1 to 10 above is sealed.

12. An electronic circuit using the capacitor described in 11 above.

13. An electronic device using the capacitor described in 11 above.

14. A carbon paste for producing a capacitor element, mainly comprising carbon and containing a dopant.

15. The carbon paste as described in 14 above, wherein the dopant is a compound having a sulfonic acid group.

16. The carbon paste as described in 14 above, wherein the carbon is at least one member selected from artificial carbon, natural carbon and carbon black.

17. The carbon paste as described in 14 above, wherein the particle size of the carbon is within the range from 0.01 to 100 μm.

18. The carbon paste as described in 14 above, comprising a polymer as a subcomponent.

The capacitor element of the present invention, basic materials of the capacitor element and materials of each layer of the capacitor element are described below.

The electric conductor to be used for the capacitor element of the present invention includes metal, alloy, an inorganic semiconductor, an organic semiconductor, carbon, a mixture of at least one member thereof, and a laminated body having the electric conductor thereof laminated as a surface layer.

Examples of the inorganic semiconductor include metal oxides such as lead dioxide, molybdenum dioxide, tungsten dioxide, niobium monoxide, niobium dioxide, tin dioxide and zirconium monoxide. Examples of the organic semiconductor include electrically conducting polymers such as polypyrrole, polythiophene, polyaniline and substitution product or copolymer having such a polymer backbone, and low molecular complexes such as complex of tetracyanoquinodimethane and tetrathiotetracene (TCNQ), and TCNQ salt. Examples of the laminated body obtained by laminating an electric conductor as the surface layer include laminated bodies where the above-described electric conductor is laminated on paper, insulating polymer, glass or the like.

In the case of using a metal as the electric conductor, the metal may be used after subjecting a part thereof to at least one treatment selected from carbidation, phosphation, boronation, nitridation and sulfidation.

The electric conductor is not particularly limited in its shape and used in a foil-, plate- or bar-like shape, or in a form shaped or sintered after shaped from powder of the electric conductor. The electric conductor may be in a form wherein powder of the electric conductor is attached on a part of a foil- or plate-like metal. The electric conductor may be subjected to a surface treatment such as etching to have fine pores. In the case of shaping or shaping and then sintering a powder electric conductor, fine pores can be provided inside the shaped or sintered electric conductor by appropriately selecting the pressure at the shaping. Also, in the case of shaping or shaping and then sintering a powder electric conductor, a part of a separately prepared outgoing lead wire (or lead foil) may be shaped together with the electric conductor and the outgoing lead wire (or lead foil) outside the shaped electric conductor may be used as the outgoing lead of one electrode of the capacitor element. It is also possible to directly connect an outgoing lead to the electric conductor.

Preferred examples of the electric conductor of the present invention are an aluminum foil subjected to the surface treatment by etching, and a sintered body having numerous fine pores inside after shaping and sintering the powder such as tantalum powder, niobium powder, alloy powder mainly comprising tantalum, alloy powder mainly comprising niobium, niobium monoxide powder.

The dielectric layer formed on the surface of the electric conductor of the present invention includes a dielectric layer mainly comprising at least one member selected from metal oxides such as $Ta_2O_5$, $Al_2O_3$, $TiO_2$ and $Nb_2O_5$, or a dielectric layer conventionally known in the field of ceramic capacitors or film capacitors.

In the case of the former dielectric layer mainly comprising at least one member selected from metal oxides, when the dielectric layer is formed by electrochemically forming the above-mentioned electric conductor having a metal element of the metal oxide in an electrolytic solution containing a mineral acid or an organic acid, the capacitor made of the obtained capacitor element becomes an electrolytic capacitor having a polarity. Examples of the dielectric layer conventionally known in the field of ceramic or film capacitors include dielectric layers described in JP-A-63-29919 (the term "JP-A" as used herein means an "unexamined published Japanese patent application") and JP-A-63-34917. The dielectric layer mainly comprising at least one member selected from metal oxides or the dielectric layer conventionally known in the field of ceramic or film capacitors may be used by laminating a plurality of these layers. Also, the dielectric layer may be a mixture of the dielectric layer mainly comprising at least one member selected from metal oxides and the dielectric layer conventionally known in the field of ceramic or film capacitors.

Meanwhile, an example of the other electrode (cathode) of the capacitor element of the present invention is at least one organic semiconductor selected from the electrically conductive polymers as described later. The electrode must contain an electrically conductive polymer and may further contain a compound or more selected from the other organic and inorganic semiconductor.

Specific examples of the organic semiconductors include an organic semiconductor comprising benzopyrroline tetramer and chloranil, an organic semiconductor mainly comprising tetrathiotetracene, an organic semiconductor mainly comprising tetracyanoquinodimethane, and an organic semiconductor mainly comprising an electrically conducting polymer obtained by doping a dopant to a polymer containing a repeating unit represented by the following formula (1) or (2).

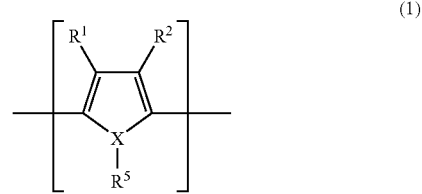

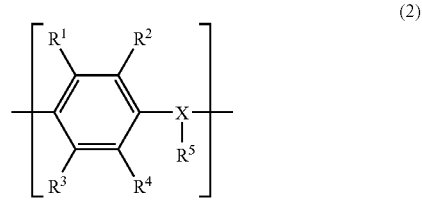

In formulae (1) and (2), $R^1$ to $R^4$ each independently represents a hydrogen atom, an alkyl group having from 1 to 6 carbon atoms or an alkoxy group having from 1 to 6 carbon atoms, X represents an oxygen atom, a sulfur atom or a nitrogen atom, $R^5$ is present only when X is a nitrogen atom and represents a hydrogen atom or an alkyl group having from 1 to 6 carbon atoms, and each of the pairs of $R^1$ and $R^2$, and $R^3$ and $R^4$ may combine with each other to form a cyclic structure.

Preferred examples of the electrically conducting polymer containing a repeating unit represented by formula (1) include an electrically conducting polymer containing a structure unit represented by the following formula (3) as a repeating unit:

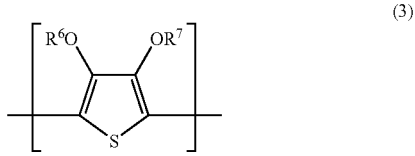

(3)

wherein $R^6$ and $R^7$ each independently represents a hydrogen atom, a linear or branched, saturated or unsaturated alkyl group having from 1 to 6 carbon atoms, or a substituent for forming at least one 5-, 6- or 7-membered saturated hydrocarbon cyclic structure containing two oxygen atoms when the alkyl groups are combined with each other at an arbitrary position. The cyclic structure includes a structure having a vinylene bond which may be substituted, and a phenylene structure which may be substituted.

The electrically conducting polymer containing such a chemical structure is electrically charged and a dopant is doped thereto. For the dopant, known dopants can be used without limitation.

Preferred examples of the dopant include a compound having a sulfonic acid group. Specific compounds are sulfonic acid having an aryl group such as benzene sulfonic acid, toluene sulfonic acid, naphthalene sulfonic acid, anthracene sulfonic acid, benzoquinone sulfonic acid, naphthoquinone sulfonic acid and anthraquinone sulfonic acid; sulfonic acid having an alkyl group such as butylsulfonic acid, hexylsulfonic acid and cyclohexylsulfonic acid; sulfonic acid having various polymers (degree of polymerization: 2 to 200) such as polyvinylsulfonic acid; salts (ammonium salt, alkali metal salt, alkali earth metal salt, etc.) of these sulfonic acids; and a mixture of these sulfonic acid and salts thereof. These compounds may contain various sub-sutituent groups or plural sulfonic acid groups may present (e.g., 2,6-naphthalane disulfonic acid and 1,2-ethane disulofnic acid). Also, two or more kinds of dopants may be used.

Examples of the polymer containing a repeating unit represented by formula (1), (2) or (3) include polyaniline, polyoxyphenylene, polyphenylene sulfide, polythiophene, polyfuran, polypyrrole, polymethylpyrrole, and substitution derivatives and copolymers thereof. Among these, preferred are polypyrrole, polythiophene and substitution derivatives thereof (e.g., poly(3,4-ethylenedioxythiophene)).

Specific examples of the inorganic semiconductors include at least one compound selected from molybdenum dioxide, tungsten dioxide, lead dioxide and manganese dioxide, etc.

When the organic or inorganic-semiconductor used has an electrical conductivity of $10^{-2}$ to $10^3$ S·cm, the capacitor produced can have a small ESR value and this is preferable.

In the present invention, in order to repair fine defects of the dielectric layer generated resulting from formation of the semiconductor layer, re-electrochemical formation (when the dielectric layer is not formed by electrochemical formation, first electrochemical formation) may be performed.

The re-electrochemical formation can be performed in the same manner as in the method described above for forming the dielectric layer by electrochemical formation. The re-electrochemical formation is performed at a voltage of the electrochemical formation voltage or lower.

In the present invention, it is important to make a dopant contained in the carbon layer which is provided on the semiconductor layer formed by the above-mentioned method or the like. There is no particular limitation on the dopant to be contained and known dopants can be used. However, a compound having a sulfonic acid group is preferably used because it has little adverse effects on the semiconductor layer.

Though the dopant to be used in the present invention is described as a compound, it is to include one in a state that is partially charged (δ-) or ionized (mostly being anion) (for example, in the case of benzene sulfonate, benzene sulfonate anion is also included).

Specific examples of the compounds having a sulfonic acid group include the above-mentioned compounds. Two or more kinds of dopants may be contained in the carbon layer. However, the same dopant as the one in the electrically conductive polymer of the semiconductor layer is preferable, because the capacitor produced thereof has a longer life at a high-temperature load.

The carbon layer can be formed by, for example, performing at least once the operation of dipping the predetermined part of the capacitor element formed up to the semiconductor layer in the carbon paste bath to be hereinafter described, pulling out and drying it. Though the thickness of the carbon paste layer is generally defined within a range of 0.01 to 200 μm, when the temperature load test is performed at a higher temperature, the layer is preferably thicker than usual, and defined within a range of 0.4 to 200 μm.

To the carbon paste to be used in the present invention is added, as a main composition other than carbon, the above-mentioned dopant; insulating polymer and/or monomer or oligomer which is polymerized and becomes insulating polymer when the carbon paste comes to a carbon layer by dry-curing; and a solvent of insulating polymer. To the carbon paste, a curing agent of monomer or oligomer and various dispersions may be further added. Moreover, electrically conductive polymer may be added to the carbon paste in order to approximate the thermal expansion coefficient of the semiconductor layer to that of the carbon layer for the purpose of maintaining the heat resistance at the moment of solder mounting of the end-product capacitor. In this case, though a dopant exists in the electrically conductive polymer added to the carbon paste, it is not very effective in mitigating the increase in ESR, which is an objective of the present invention, unless the dopant is the same kind as that contained in the carbon layer.

As the carbon for the carbon paste, at least one member selected from artificial graphite, natural graphite and carbon black represented by acetylene black and Ketjen Black may be used. The particle size of the carbon to be used is 0.01 to 100 μm, preferably 0.1 to 30 μm, more preferably 0.5 to 15 μm. The contact resistance between the carbon particles increases if the particle size is too small, while connectivity with the semiconductor layer deteriorates if the particle size is too large, which leads to the initial failure in the ESR value of the capacitor produced thereof.

The artificial graphite which may be used includes not only the granulated one but also fibril one, e.g., polyacrylonitrile (PAN) carbon fiber, single-layer carbon nanotube, double-layer carbon nanotube, multilayer carbon nanotubue, carbon coil and vapor grown carbon fiber. The fiber diameter to be used is 0.001 to 100 µm, preferably 0.01 to 30 µm, more preferably 0.02 to 1 µm.

Insulating polymer is used for the carbon paste as a binder of the carbon layer. As for the insulating polymer, at least one kind of various known resins may be used, such as acrylic resin, cellulose resin, phenol resin, epoxy resin, urea resin, alkyd resin, ester resin, imide resin, amide resin, fluororesin and imidamide resin. The content of the insulating polymer varies depending upon the kind of the capacitor element produced thereof, the thickness of the carbon layer and the kinds of the insulating polymer and carbon to be used, and determined by previously performing an experiment in consideration of the initial performance of the capacitor. The content is generally 50 mass % or less, preferably 30 mass % or less.

A solvent of the above-mentioned insulating polymer is used for the carbon paste. As a solvent, water or at least one member of known solvents such as various kinds of alcohol, ester, ketone and aromatic series. By dissipating the solvent, the carbon paste is cured and becomes a carbon layer.

One example of the methods for incorporating a dopant into the carbon paste is a method of stirring the mixture of carbon, dopant and a solvent of the dopant, leaving the mixture to stand for a few days to dissipate the solvent. The content of the dopant is 0.01 to 20 mass % of the carbon, preferably 0.1 to 15 mass %; more preferably 0.3 to 10 mass %. If the content is too low, the effect of the present invention cannot be attained, while a too high content impairs the electrical conductivity of the carbon per se.

When undergoing a high temperature loading test for thousands hours, the increase in ESR is smaller in the capacitor produced from the capacitor element of the present invention than that in the conventional capacitor. When applying voltage to a capacitor, positive charge is accumulated in the electric conductor side and negative charge in the semiconductor layer side. Since the dopant in the electrically conductive polymer is present generally in the form of anion, it tends to recede from the negative charge accumulated in the semiconductor layer side during the high temperature loading test. Meanwhile, the carbon in the carbon layer is regarded as a special electrically conductive polymer, and it is expected that the dopant will escape from the negative charge in the semiconductor layer side into the micro structure of the carbon (layer structure) or the vicinity thereof. As a result, it is assumed that the reduction of the dopant lowers the conductivity of the electrically conductive polymer and ESR of the capacitor rises.

On the other hand, if a dopant is contained in the carbon layer in advance, it is assumed to mitigate the diffusion of the dopant from the electrically conductive polymer. In the case that the same dopant as that in the electrically conductive polymer as the semiconductor layer is contained in the carbon in advance, the dopant is present in the micro layer structure of the carbon in the form of an inclusion compound. Since the dopant in the semiconductor layer needs to push away the dopant in the carbon having the same size, the migration of the dopant from the semiconductor layer into the carbon layer is assumed to be suppressed.

The increase of ESR at a high temperature loading test is relatively small in a capacitor having a high leak current. It can be explained that since the capacitor is inferior in retaining the positive and negative charge in a dielectric layer due to the leak current, the dopant ion in the form of anion is less affected by the negative charge.

In the present invention, an electrode layer is provided on the carbon layer formed by the above-described method or the like. The electrode layer can be formed, for example, by solidification of an electrically conducting paste, plating, vapor deposition of a metal, or adhesion of a heat-resistant electrically conducting resin film. Preferred examples of the electrically conducting paste include silver paste, copper paste, aluminum paste, gold paste, palladium paste and nickel paste, and these may be used individually or in combination of two or more thereof. In the case of using two or more pastes, the pastes may be mixed or may be superposed one on another as separate layers. The electrically conducting paste applied is then solidified by allowing it to stand in air or under heating.

In the case that the electrically conducting paste mainly comprises resin and electrically conducting powder such as metal, a solvent for dissolving the resin, a hardening agent for the resin or a dispersing agent of a solid content is added, and the solvent dissipates at the time of solidification. As for the resin, various known resins are used, such as alkyd resin, acrylic resin, epoxy resin, phenol resin, imide resin, fluororesin, ester resin, imidamide resin, amide resin and styrene resin. As for the electrically conducting powder, at least one member selected from powder of silver, copper, aluminum, gold, palladium, nickel or an alloy mainly comprising such a metal, and mixed powder thereof is used. The content of the electrically conducting powder is usually from 40 to 97 mass %. If the content is less than 40 mass %, the electrically conducting paste is small in the electrical conductivity, whereas if the content exceeds 97 mass %, the electrically conducting paste disadvantageously causes adhesion failure. The electrically conducting paste may be used after mixing thereto the above-described electrically conducting polymer or powder of metal oxide for forming the semiconductor layer.

Examples of the plating include nickel plating, copper plating, silver plating and aluminum plating. Examples of the metal vapor-deposited include aluminum, nickel, copper and silver.

Specifically, for example, an electrode layer is formed by stacking silver paste on the carbon layer followed by drying. In this way, a capacitor element where a cathode part is formed by stacking layers up to the electrode layer is produced.

The capacitor element of the present invention having such a constitution is jacketed, for example, by resin mold, a resin case, a metallic jacket case, resin dipping or a laminate film and thereby can be completed as a capacitor product for various uses. Among these, a chip capacitor jacketed by resin mold is preferred, because reduction in the size and in the cost can be simply attained.

Next, the case of resin mold jacketing is specifically explained. In the production of the capacitor of the present invention, a part of the electrode layer of the capacitor element is laid on one end part of a separately prepared lead frame having a pair of oppositely disposed end parts, and a part of the electric conductor (in the case that the electric conductor has a structure comprising an anode lead, the anode lead the end of which is cut off to adjust the dimensions) is laid on the other end part, respective parts are electrically and mechanically connected, for example, by solidification of an electrically conducting paste for the former and by welding for the latter, the entirety is molded with a resin while leaving outside a part of each end part of the lead frame, and the lead frame is cut at predetermined portions outside the resin molding and bent to fabricate a capacitor. Or, in the case that the lead frame is placed under the resin molding and sealed leaving only the lower surface or lower and side surfaces thereof, the lead frame is cut to fabricate a capacitor.

The lead frame is cut as described above and finally serves as external terminals of the capacitor. The shape thereof is a foil or tabular form and the material is iron, copper, aluminum or an alloy mainly comprising such a metal. The lead frame may be partially or entirely plated with at least one layer of solder, tin, titanium, gold, silver, nickel, palladium, copper or the like.

The lead frame may be plated with the various materials as mentioned above before or after being cut off and bent. It is also possible to plate the lead frame before the solid electrolytic capacitor element is placed thereon and connected with, and replate the lead frame at any time after sealing.

The lead frame is disposed such that a pair of the end parts of the frames face each other with a gap, and by virtue of the presence of a gap, the electric conductor part and the electrode layer part of each solid electrolyte capacitor element are insulated from each other.

As for the kind of the resin used for resin mold jacketing, a known resin for use in the molding of a capacitor, such as epoxy resin, phenol resin alkyd resin, ester resin and aryl ester resin can be employed. Each resin is preferably a commercially available low-stress resin, so that the molding stress on the capacitor element generated at the molding can be mitigated. For the production machine for performing the molding with resin, a transfer machine is preferably used.

The thus-produced capacitor may be subjected to an aging treatment so as to repair the thermal and/or physical deterioration of the dielectric layer, which is caused at the formation of carbon layer and electrode layer or at the jacketing. The aging is performed by applying a predetermined voltage (usually, within two times the rated voltage) to the capacitor. The optimal values of aging time and temperature vary depending on the kind and capacitance of the capacitor and the rated voltage and therefore, are determined by previously performing an experiment, but the aging time is usually from several minutes to several days and the aging temperature is usually 300° C. or less by taking account of heat deterioration of the voltage-applying jig.

The aging may be performed in an air atmosphere or a gas atmosphere such as argon, nitrogen or helium and may be performed under reduced pressure, atmospheric pressure or applied pressure, but when the aging is performed while supplying water vapor or after water vapor is supplied, the stabilization of a dielectric layer sometimes proceeds. Examples of the method for supplying the water vapor include a method of supplying water vapor from a water reservoir placed in the aging furnace by using the heat.

As for the method of applying a voltage, it can be designed to pass an arbitrary current such as direct current, alternating current having an arbitrary waveform, alternating current superposed on direct current and pulse current. It is also possible to once stop the voltage application on the way of aging and again apply a voltage.

The capacitor produced in the present invention can be preferably used for circuits requiring a high-capacitance capacitor, such as a central processing circuit and a power source circuit. These circuits can be used in various digital devices such as a personal computer, server, camera, game machine, DVD equipment, AV equipment and cellular phone, and electronic devices such as various power sources. The capacitor produced in the present invention has a long operating life and good ESR performance and therefore, by using this capacitor, electronic circuits and electronic devices being excellent in fast response property and reliability can be obtained.

BEST MODE TO CARRY OUT THE INVENTION

The present invention is described in greater detail by referring to Examples, however, the present invention is not limited to these Examples.

1. Production of Carbon Pastes A to S:

The following carbon, dopant, insulating polymer and solvent are used.

Carbon:

(1) Artificial graphite: The carbon of Nippon Graphite Industries, ltd. (CP grade) was pulverized and the content of the particles having a designated size was classified.

(2) Natural graphite: After sintering at 1400° C. to remove impurities, petroleum coke was completely sintered at 2700° C. The resultant solid content was pulverized and the content of the particles having a designated size was classified.

(3) Carbon black: carbon black of SHOWA CABOT K. K. was pulverized and the content of the particles having a designated size was classified.

Dopant:

(1) naphthalane sulfonic acid, (2) anthoraquinone sulfonic acid, (3) benzoquinone sulfonic acid and (4) ammonium borodisalicylate (all of them produced by Tomiyama Pure Chemical Industries, Limited)

Insulating Polymer:

(1) acrylic resin (product of Sanyo Trading Co., Ltd., acryloid), (2) cellulose resin (product of Nagase & Co., Ltd., CAB381-30), (3) phenol resin (product of Japan Reichhold, Prichofen 5010), (4) epoxy resin (product of Tohto Kasei Co.,Ltd., Epotohto), (5) alkyd resin (product of Harima Chemicals, Inc., Hariphthal), (6) fluorine resin (product of Asahi Glass Co., Ltd., Lumiflon)

Solvent:

(1) water, (2) ethanol, (3) isopropyl alcohol, (4) amyl alcohol, (5) butyl acetate.

A designated amount of each compound serving as a dopant for 10 g of each carbon listed in Table 1 was weighed. Both of the carbon and weighed dopant were stirred for ten hours under reflux in ethanol. To the produced carbon containing a dopant, a designated amount of insulating polymer and solvent listed in Table 1 were added to obtain carbon pastes A to S.

TABLE 1

| Carbon paste | Carbon type (average diameter) | Dopant Type | Dopant Amount (g) | Insulating polymer Type | Insulating polymer Amount (mass %) | Solvent |
|---|---|---|---|---|---|---|
| A | Natural graphite (4 μm) | naphthalene sulfonic acid | 10 | Acrylic resin | 4 | Water + ethanol (10%) |
| B | Same as above | Same as above | 5 | Cellulose resin | 7 | Water |
| C | Same as above | Same as above | 0.5 | Phenol resin | 5 | Isopropyl alcohol |
| D | Artificial graphite (containing 15% of carbon black) (2 μm) | anthra-quinone-sulfonic acid | 15 | Acrylic resin | 3 | Water + ethanol (10%) |
| E | Same as above | Same as above | 3 | Cellulose resin | 3 | Water + ethanol (10%) |
|   |   |   |   | Acrylic resin | 2 |   |
| F | Same as above | Same as above | 0.4 | Phenol resin | 11 | Isopropyl alcohol |
| G | Same as above | anthra-quinone-sulfonic acid | 1 | Epoxy resin | 2 | Amil alcohol |
|   |   | benzo-quinone-sulfonic acid | 2 |   |   |   |
| H | Natural graphite (containing 10% of carbon black) (7 μm) | Same as above | Same as above | Cellulose resin | 8 | Water + ethanol (2%) |
| I | Same as above | Same as above | Same as above | Phenol resin | 5 | Isopropyl alcohol |
| J | Same as above | Same as above | Same as above | Alkyd resin | 13 | Butyl acetate |
| K | Same as above | Same as above | Same as above | Fluorine resin | 7 | Amil alcohol |
| L | Same as above | Same as above | Same as above | Acrylic resin | 4 | Water + ethanol (10%) |
| M | The same as Paste A except that a dopant is not contained |
| N | The same as Paste B except that a dopant is not contained |
| O | The same as Paste D except that a dopant is not contained |
| P | The same as Paste G except that a dopant is not contained |
| Q | The same as Paste H except that a dopant is not contained |
| R | The same as Paste I except that a dopant is not contained |
| S | The same as Paste A except that ammonium borodisalicylate is used as a dopant |

2. Production of a Capacitor Element and a Capacitor

EXAMPLES 1 TO 6 AND COMPARATIVE EXAMPLES 1 TO 3

A niobium primary powder (average particle size: 0.35 μm) ground by utilizing the hydrogen embrittlement of a niobium ingot was granulated to obtain a niobium powder having an average particle size of 110 μm (this was a fine powder and therefore, naturally oxidized to contain 95,000 ppm of oxygen). The obtained niobium powder was left standing in a nitrogen atmosphere at 450° C. and then in Ar at 700° C. to provide a partially nitrided niobium powder (CV: 252,000 μF·V/g) having a nitrided amount of 9,000 ppm. The resulting niobium powder was molded together with a 0.48 mmφ niobium wire and then sintered at 1,280° C. In this way, a plurality of sintered bodies (electric conductors) having a size of 4.0×3.5×1.7 mm (mass: 0.08 g, a niobium wire working as a lead wire is present 3.7 mm inside and 8 mm outside of the sintered body) were produced.

Each sintered body was electrochemically formed in an aqueous 0.1% phosphoric acid solution for seven hours under conditions of 80° C. and 20 V to form a dielectric layer mainly comprising diniobium pentoxide on the sintered body surface and a part of the lead wire. Consequently, the sintered body was dipped in 2 mass % iron naphthalenesulfonate solution and dried to remove moisture. The operation was repeated eight times alternately with re-electrochemically formation of the sintered body in an 0.1 mass % aqueous acetic acid solution for 15 minutes under conditions of 80° C. and 15 V. Further, the sintered body was subjected to electrolytic polymerization for 120 minutes in a separately prepared aqueous solution having dissolved therein traces of ethylene dioxythiophene monomer and 4 mass % anthraquinonesulfonic acid, and pulled out from the solution. And after the steps of washing with water—washing with alcohol—drying of the sintered body, re-electrochemical formation was performed in a 1 mass % phosphoric acid solution for 15 minutes under conditions of 80° C. and 14 V. The electrolytic porimerizaiton and re-electrochemical formation were repeated seven times to form on the dielectric layer a semiconductor layer comprising polythiophene derivative having anthraquinone sulfonic acid ion as a main dopant.

After each of the carbon pastes shown in Table 1 was stacked on the semiconductor layer and dried to provide a carbon layer, silver paste comprising 90 mass % of silver powder and 10 mass % of acrylic resin were stacked and dried to form an electrode layer, thereby producing a plurality of solid electrolyte capacitor elements. The capacitor element was placed on a separately prepared lead frame (copper alloy C151, product of Hitachi Cable, Ltd., having matte nickel plating of 10 μm thickness on both surfaces) serving as an external electrode such that the lead wire on the side of the sintered body and the silver paste part on the side of the electrode layer were lying on a pair of the end parts of the lead frame, respectively. The lead wire on the side of the sintered body and the silver paste part on the side of the electrode layer were then electrically/mechanically connected by spot-welding for the former and with the same silver paste as used for the electrode layer for the latter. Thereafter, the entirety excluding a part of the lead frame was transfer-molded with epoxy resin and the lead frame outside the mold was cut off at a predetermined position and the remaining frame was bent along the jacket, to thereby produce a chip capacitor having a size of 7.3×4.3×2.8 mm having the lead frame serving as an external terminal. Subsequently, the capacitor was subjected to aging (125° C., 7 V, three hours) and passed three times through a tunnel oven set to take a temperature pattern having a peak at 270° C. (standing at 230° C. for 35 seconds) to complete the chip capacitor as an end product.

EXAMPLES 7 TO 12 AND COMPARATIVE EXAMPLES 4 TO 6

By using tantalum powder having CV (product of capacitance and electrochemical voltage) of 150,000 μF·V/g, sintered bodies in a size of 4.5×0.97×3.1 mm were produced (sintering temperature: 1,300° C., sintering time: 20 minutes, density of sintered body: 6.1 g/cm$^3$, Ta lead wire: 0.40 mmφ; a part of the Ta lead wire was embedded in the sintered body to run in parallel to the longitudinal direction of the 4.5 mm dimension and the lead wire part protruded from the sintered body was used as the anode part). The sintered body excluding a part of the lead wire was dipped in an aqueous 1 mass % phosphoric acid solution and electrochemically formed at 80° C. for 5 hours by applying a voltage of 10 V between the sintered body and a Ta plate electrode used as the negative electrode to form a dielectric oxide film layer mainly comprising $Ta_2O_5$. Then, an operations of dipping this sintered body in a tank of a 20 mass % sodium molybdate solution followed by drying and dipping in a tank of a 10 mass % of sodium borohydride solution followed by drying were alternately repeated, and re-electrochemical formation (80° C., 10 minutes, 8 V) in an aqueous 0.1% acetic acid solution was repeated several times to form fine electrically defective portions in the dielectric layer.

Subsequently, the sintered body was dipped in a tank of a mixture solution of 20 mass % ethylene glycol and water wherein 0.2M sodium naphthalenesulfonate and pyrrole were charged in a more than sufficient amount such that part of them remain insoluble (the tank is lined with tantalum foil and serves as an external electrode). Current was applied thereto at 13V for one hour between the lead wire of the sintered body as an anode and the external electrode as a cathode to form a semiconductor layer on the dielectric layer. The sintered body was pulled out from the tank, washed with water and alcohol sequentially and dried. Further, re-electrochemical formation (80° C., one hour, 7 V) in an aqueous 0.1% acetic acid solution was performed, and the sintered body was pulled out from the solution, washed with water and alcohol sequentially and dried. The steps of forming a semiconductor layer and re-electrochemical formation was repeated ten times to form a semiconductor layer comprising polypyrrole having naphthalenesulfonate ions as a main dopant. Subsequently, after each of the carbon pastes shown in Table. 1 was stacked on the semiconductor layer and dried to provide a carbon layer, silver paste comprising 93 mass % of silver powder and 7 mass % of epoxy resin were stacked and dried to form an electrode layer, thereby producing a plurality of capacitor elements. The capacitor element was placed on a separately prepared lead frame (copper alloy KLF, product of Kobe Steel, Ltd., having nickel primer plating of 0.7 μm thickness and lusterless tin plating of 0.7 μm thickness on both surfaces) serving as an external electrode such that the lead wire on the side of the sintered body and the silver paste part on the side of the electrode layer were lying on a pair of the end parts of the lead frame, respectively. The lead wire on the side of the sintered body and the silver paste part on the side of the electrode layer were then electrically/mechanically connected by spot-welding for the former and with the same silver paste as used for the electrode layer for the latter. Thereafter, the entirety excluding a part of the lead frame was transfer-molded with epoxy resin and the lead frame outside the mold was cut off at a predetermined position and the remaining frame was bent along the jacket, to thereby produce a chip capacitor having a size of 7.3×4.3×1.8 mm having the lead frame serving as an external terminal.

Subsequently, the capacitor was subjected to aging (155° C., 3 V, three hours) and passed once through a tunnel oven set to take a temperature pattern having a peak at 260° C. (standing at 230° C. for 30 seconds) to complete the chip capacitor as an end product.

EXAMPLES 13 TO 16

A plurality of chip capacitors were produced in the same way as in Example 1 except that the niobium sintered body in Example 1 was replaced by a niobium monoxide sintered body (sintering temperature: 1,480° C., CV: 180,000 μF·V/g, mass: 0.065 g) produced from niobium monoxide powder having an average diameter of 120 μm which was granulated from niobium monoxide powder (diameter: 0.51 μm) obtained by reducing diniobium pentoxide and that the thickness of the carbon layer was varied in order by changing the adding amount of the carbon paste.

EXAMPLE 17

Capacitor elements and capacitors were produced in the same way as in Example 1 except that carbon paste S was employed as a carbon paste.

Table 2 shows the average thickness of the carbon layer, initial value and value after a high-temperature loading test in the capacitance and ESR of each capacitor produced in Examples 1 to 17 and Comparative Examples 1 to 6. The value after the high-temperature loading test was measured after having the capacitor pass through a reflow furnace set to take a temperature pattern having a peak at 260° C. (standing at 230° C. for 30 seconds), mounting the capacitor on the substrate with soldering, applying a voltage (4V in Examples 1 to 6 and 13 to 16 and Comparative Examples 1 to 3 and 2.5V in Examples 7 to 12 and Comparative Examples 4 to 6) at 140° C. to the capacitor for 1000 hours and cooling to room temperature. All data in Table 1 are an average value of 640 units of the capacitors in each example.

Average Thickness of a Carbon Layer:

A cross section parallel to the minor axis direction of a sintered body formed up to a carbon layer in the same way was micrographed at 1000-fold magnification. The value of the most frequently appearing parts was taken.

Capacitance of the Capacitor:

The capacitance was measured at room temperature and 120 Hz by using an LCR measuring meter manufactured by Hewlett Packard, Ltd.

ESR Value:

The equivalent series resistance of the capacitor was measured at room temperature and 100 kHz.

TABLE 2

|  | Carbon paste | Thickness of the carbon layer (μm) | Initial value Capacitance (μF) | Initial value ESR (mΩ) | Value after high-temperature loading test Capacitance (μF) | Value after high-temperature loading test ESR (mΩ) |
|---|---|---|---|---|---|---|
| Example 1 | A | 0.5 | 800 | 20 | 750 | 27 |
| Example 2 | B | 1.5 | 800 | 22 | 740 | 28 |
| Example 3 | C | 2.5 | 800 | 18 | 770 | 23 |
| Example 4 | D | 0.8 | 810 | 24 | 740 | 27 |
| Example 5 | E | 3.5 | 800 | 19 | 780 | 21 |
| Example 6 | F | 0.8 | 800 | 20 | 760 | 23 |
| Example 7 | G | 1.5 | 980 | 15 | 930 | 21 |
| Example 8 | H | 2.0 | 980 | 15 | 930 | 20 |
| Example 9 | I | 3.5 | 980 | 14 | 950 | 18 |
| Example 10 | J | 4.5 | 980 | 18 | 920 | 22 |
| Example 11 | K | 8.0 | 980 | 17 | 940 | 20 |
| Example 12 | L | 2.5 | 980 | 16 | 930 | 22 |
| Example 13 | A | 0.1 | 455 | 25 | 425 | 34 |
| Example 14 | A | 1.0 | 455 | 25 | 430 | 32 |
| Example 15 | A | 10 | 455 | 26 | 435 | 29 |
| Example 16 | A | 25 | 455 | 26 | 440 | 27 |
| Example 17 | S | 0.6 | 800 | 23 | 730 | 32 |
| Comp. Ex. 1 | M | 0.5 | 800 | 19 | 670 | 45 |
| Comp. Ex. 2 | N | 1.5 | 800 | 20 | 680 | 44 |
| Comp. Ex. 3 | O | 1.0 | 800 | 22 | 680 | 46 |
| Comp. Ex. 4 | P | 1.5 | 980 | 15 | 870 | 43 |
| Comp. Ex. 5 | Q | 2.3 | 980 | 16 | 880 | 42 |
| Comp. Ex. 6 | R | 3.5 | 980 | 15 | 880 | 41 |

As seen from comparison between Examples 1 to 6 and Comparative Examples 1 to 3 and between Examples 7 to 12 and Comparative Examples 4 to 6 respectively, by using a carbon paste containing a dopant for the carbon layer, increase in the ESR value of the capacitor produced thereof after a high temperature loading test can be mitigated.

INDUSTRIAL APPLICABILITY

The present invention provides a carbon paste comprising a dopant in a carbon layer, a capacitor element using the carbon paste in a carbon layer and a capacitor having the capacitor element sealed therein. A long-life capacitor can be produced according to the present invention.

The invention claimed is:

1. A capacitor element comprising, an electric conductor having formed on the surface thereof a dielectric layer as one electrode; and a semiconductor layer, carbon layer comprising a cured carbon paste and electrode layer formed sequentially on the dielectric layer; said carbon paste mainly comprising carbon and containing a dopant, an insulating polymer and/or a monomer or oligomer forming an insulating polymer through polymerization and a solvent of the insulating polymer.

2. The capacitor element as claimed in claim 1, wherein the dopant is the same as the dopant contained in the semiconductor layer.

3. The capacitor element as claimed in claim 1, wherein the dopant is a compound having a sulfonic acid group.

4. The capacitor element as claimed in claim 1, wherein the electric conductor is selected from a metal, an inorganic semiconductor, an organic semiconductor, a mixture of at least one member thereof, and a laminated body having the electric conductor thereof laminated as a surface layer.

5. The capacitor element as claimed in claim 1, wherein the electric conductor is a metal or alloy mainly comprising at least one member selected from tantalum, niobium, titanium and aluminum; niobium oxide; or a mixture of at least two of the members selected from these metals, alloy and niobium oxide.

6. The capacitor element as claimed in claim 1, wherein the semiconductor layer is at least one member selected from an organic semiconductor layer and an inorganic semiconductor layer.

7. The capacitor element as claimed in claim 6, wherein the organic semiconductor layer is made of a material which contains a dopant in a polymer selected from polyaniline, polyoxyphenylene, polyphenylene sulfide, polythiophene, polyfuran, polypyrrole, polymethylpyrrole, and substitution derivatives and copolymers thereof.

8. The capacitor element as claimed in claim 7, wherein the polymer is poly(3,4-ethylenedioxythiophene).

9. The capacitor element as claimed in claim 6, wherein the electrical conductivity of the semiconductor is from $10^{-2}$ to $10^3$ S/cm.

10. A capacitor in which the capacitor element as claimed in claim 1 is sealed.

11. An electronic circuit using the capacitor claimed in claim 10.

12. An electronic device using the capacitor claimed in claim 10.

13. The capacitor element as claimed in claim 1, wherein the insulating polymer of the cured carbon paste is selected from the group consisting of acrylic resin, cellulose resin, phenol resin, epoxy resin, urea resin, alkyd resin, ester resin, imide resin, amide resin, fluororesin and imidamide resin.

14. The capacitor element as claimed in claim 1, wherein the solvent of the insulating polymer is selected from the group consisting of water, alcohols, esters, ketones and aromatic compounds, the insulating polymer being soluble in said solvent.

15. The capacitor element as claimed in claim 1, wherein the insulating polymer is selected from the group consisting of acrylic resin, cellulose resin, phenol resin, epoxy resin, urea resin, alkyd resin, ester resin, imide resin, amide resin, fluororesin and imidamide resin and the solvent of the insulating polymer is selected from the group consisting of water, alcohols, esters, ketones and aromatic compounds, the insulating polymer being soluble in said solvent.

16. A carbon paste for producing a capacitor element, mainly comprising carbon and containing a dopant, an insulating polymer and/or a monomer or oligomer forming an insulating polymer through polymerization and a solvent of the insulating polymer.

17. The carbon paste as claimed in claim 16, wherein the dopant is a compound having a sulfonic acid group.

18. The carbon paste as claimed in claim 16, wherein the carbon is at least one member selected from artificial carbon, natural carbon and carbon black.

19. The carbon paste as claimed in claim 16, wherein the particle size of the carbon is within the range from 0.01 to 100 μm.

20. The carbon paste as claimed in claim 16, comprising a polymer as a subcomponent.

21. The carbon paste as claimed in claim 16, wherein the insulating polymer is selected from the group consisting of acrylic resin, cellulose resin, phenol resin, epoxy resin, urea resin, alkyd resin, ester resin, imide resin, amide resin, fluororesin and imidamide resin.

22. The carbon paste as claimed in claim 16, wherein the solvent of the insulating polymer is selected from the group consisting of water, alcohols, esters, ketones and aromatic compounds, the insulating polymer being soluble in said solvent.

23. The carbon paste as claimed in claim 16, wherein the insulating polymer is selected from the group consisting of acrylic resin, cellulose resin, phenol resin, epoxy resin, urea resin, alkyd resin, ester resin, imide resin, amide resin, fluororesin and imidamide resin and the solvent of the insulating polymer is selected from the group consisting of water, alcohols, esters, ketones and aromatic compounds, the insulating polymer being soluble in said solvent.

24. A capacitor element comprising, an electric conductor having formed on the surface thereof a dielectric layer as one electrode; and a semiconductor layer, carbon layer and electrode layer formed sequentially on the dielectric layer; characterized in that the carbon layer contains a dopant, the semiconductor layer comprises an inorganic semiconductor layer, and the inorganic semiconductor of said inorganic semiconductor layer is at least one compound selected from the group consisting of molybdenum dioxide, tungsten dioxide, lead dioxide and manganese dioxide.

* * * * *